J. W. OSBORNE.
Speed-Gages.

Patented May 20, 1873.

Attest;
Edw. W. Donn
Samuel Copic

Inventor;
John W. Osborne

AM. PHOTO-LITHOGRAPHIC CO. N.Y. (OSBORNE'S PROCESS.)

J. W. OSBORNE.
Speed-Gages.

Patented May 20, 1873.

Attest:
Edw. W. Donn
Samuel Cassidy

Inventor:
John W. Osborne

AM. PHOTO-LITHOGRAPHIC CO. N.Y. (OSBORNE'S PROCESS.)

UNITED STATES PATENT OFFICE

JOHN W. OSBORNE, OF WASHINGTON, DISTRICT OF COLUMBIA.

IMPROVEMENT IN SPEED-GAGES.

Specification forming part of Letters Patent No. 139,184, dated May 20, 1873; application filed September 3, 1872.

*To all whom it may concern:*

Be it known that I, JOHN WALTER OSBORNE, of Washington, District of Columbia, have invented an Improved Speed-Gage, of which the following is a specification:

Nature and Object.

This invention belongs to the class of machines used for the purpose of determining the velocity or rate of speed at which shafting or wheels are rotating. It consists in the combination of an index-hand or pointer, a graduated dial, a current-receiver, and retarding-spring with a current-generator, whereby the force of the current produced in any fluid acted upon by the generator can be indicated upon the dial, which may be so graduated as to express the number of revolutions which the generator makes per second, minute, &c., and whereby the trouble of counting and rating the speed by time is completely avoided.

Drawings.

Figures 1, 2, 3 illustrate in detail the construction of a rate-gage or speed-indicator, in which dense fluids, such as oil, glycerine, or water, are used. Figs. 4, 5, 6 show the parts of a similar instrument, adapted to use air as the medium in which a current is produced.

The principle in both cases is identical, and, as the construction is also essentially the same, the corresponding parts in each set of figures are indicated by the same letters.

Fig. 1 is a front elevation of the gage, showing the index-hand $d$ and the the graduated scale, on which it indicates the number of revolutions which are being made per second, minute, &c., at the time of observation.

$e$ is a light spring, attached at $e'$, which acts as a stop, and softens the blow struck by the pointer on arriving at either end of its course. B is a reservoir, connected with the closed chamber, to contain any excess of liquid. G is a foot or stand, shown in part, by which the gage can be firmly attached to any convenient and suitable place.

Fig. 2 is a vertical cross-section at right angles to the face of the gage.

The outer case, as here shown, consists of a cylindrical box or drum, A A A A, one end of which is closed by a disk of glass or mica, K K, (I prefer the latter,) made water or oil tight by the pressure of the screws acting on the ring H H, and by packing, if necessary. I I is a circular plate or diaphragm, which serves as a support for parts afterward to be described. It is perforated at top and bottom by small holes $f\,f$ to admit of the passage of fluid. Two holes, $b\,b'$, also connect the gage-box with the reservoir B. N is a short spindle or shaft, passing through the stuffing-box L. To its outer end a pulley, M, of suitable size, is firmly attached, to which rotary motion is communicated by a belt or chain, working over the shaft or pulley, the speed of which is to be rated. Its inner extremity carries the "current-generator," which consists of a number of flat radial vanes or fans, C C, screwed fast to the shaft, the plane of each being at right angles to the face of the gage, and to the plane in which they rotate when set in motion by the driving mechanism outside. The number of these vanes shown in the drawing is eight, which will be found in many cases to give satisfactory results; but for low speeds the number may be increased; and for very high speeds fewer vanes will answer well. Their form may be variously modified; but that shown in the drawing has been found very serviceable. $a$ is an arbor, of small diameter, running in very delicate bearings, pierced through the plate I I and the bar F. On its outer extremity it carries the pointer $d$, visible through the glass or mica plate in front. To its inner end the arm of the "current-receiver" D is attached, all three being rigidly connected. The current-receiver consists of a vane, which may be dish-shaped, as in the drawing, so as to acquire stiffness and enable it better to receive the force of the generated current. It should be made of very thin and light material, and should, when *in situ*, counterpoise the pointer as nearly as possible. The size and position of this vane must be such that it shall not touch the vanes of the current-generator. With the arbor one end of the spiral spring E is connected, while the other is made fast at E' in such a way that the pointer $d$ always lies in contact with the stop-spring $e$ with greater or less force when the instrument is at rest.

Fig. 3 is a vertical section of the gage parallel to its face on dotted lines $x\,x$, showing the essential parts inside the plate I I. The position of the pointer outside the plate is also indicated by its dotted outline, and the direction in which the current-generator should revolve, by the arrows.

Mode of Operation.

To put this instrument in working order, it is filled, through the orifice, closed by a screw-plug at the top of the reservoir B, with water, oil, glycerine, petroleum, or some other suitable liquid. I find a mixture of one part sperm-oil and two parts refined petroleum to answer very well. It will be found best to keep the gage-box at all times perfectly full, to insure which a large excess may be kept in the reservoir B. If, now, the shaft N be made to rotate in the direction shown by the arrows, a current of the liquid employed will be created, which, impinging on the receiving-vane D, will tend to deflect it and cause the revolution of the arbor $a$. The pointer $d$ will indicate to what extent the resistance of the spring has been overcome, and its position will be constant for the same number of revolutions per minute which the pulley makes. An increase of speed in the latter will increase the force of the current, and therefore determine the onward progress of the pointer, while a decrease will be followed by its retrogression. As the position of the pointer for any particular number of revolutions per minute will be constant a continuous scale can easily be constructed when a sufficient number of points upon the dial, indicating different speeds, have been found by actual experiment. It is also evident that the divisions on the scale may be made to have direct reference to the revolutions which the shaft or machine to be rated makes, irrespective of the relative size of the driving-pulley and the driven pulley upon the shaft of the current-generator; or, that the readings may be made to give the number of feet per minute, or miles per hour, &c., which pass over the pulley on said shaft, or which pass any other pulley or wheel in mechanical connection with it.

Although it is recommended in the foregoing to have the gage-box quite full of the liquid employed, yet this condition is not theoretically essential; the principle involved being the same when the instrument is but partially filled, provided the receiving-vane is immersed, and so placed as to receive the force of the generated current. In practice, however, I believe the perfectly full condition will be found best calculated to give uniform results.

Figure 1:
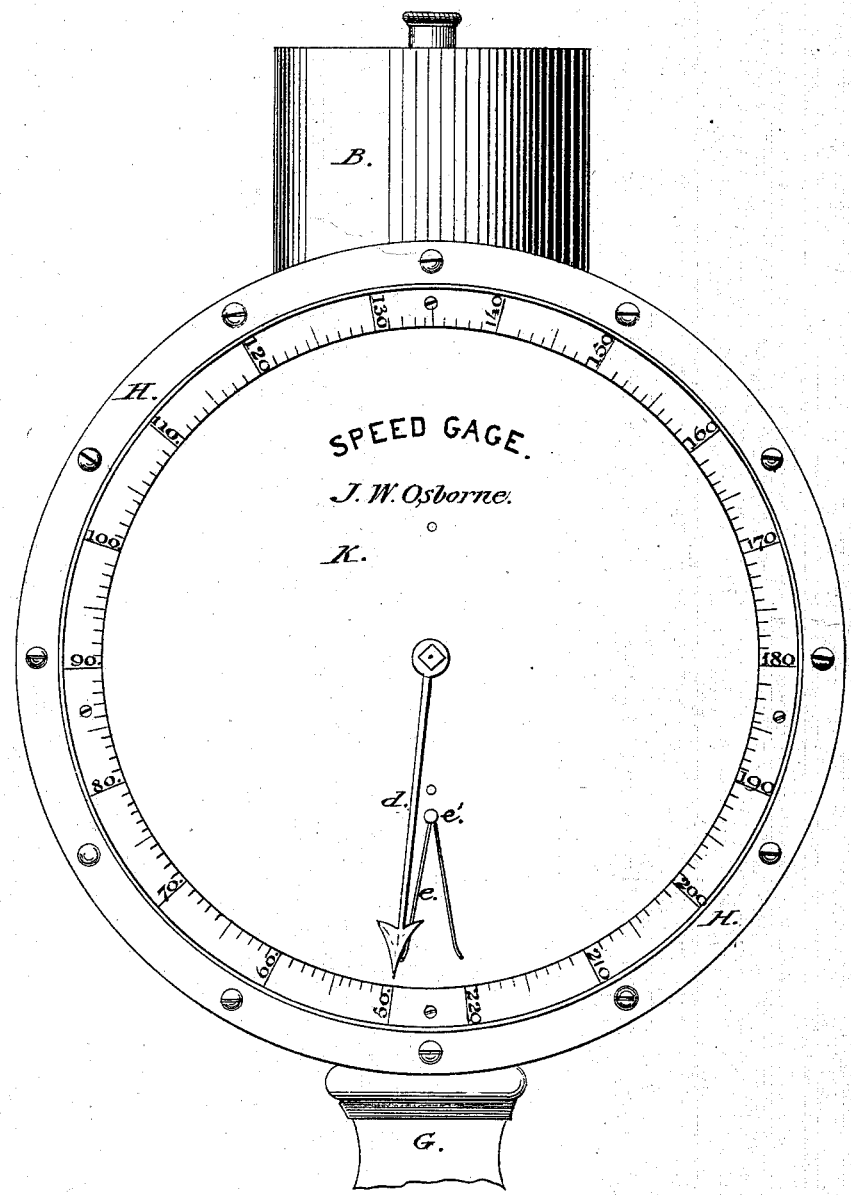

A detailed description of these drawings is unnecessary; it will be sufficient to point out the differences in construction which the use of a gaseous fluid renders desirable.

It will readily be seen that, although the force which an air-current exerts upon the receiving-vane is constant for one and the same speed, and therefore serviceable, it is much less than that which results from the rotation of a dense and non-elastic fluid; it follows, therefore, that the manner of suspending the rotating or oscillating arbor, carrying the receiving-vane and pointer, must be much more delicate, and the spring proportionately weaker. The delicacy may be accomplished by letting the extremities of the arbor terminate in points, and run in hardened steel cavities or in jewels.

The form of spring shown in the drawing is found desirable, when very slight torsional force is required.

The reservoir is dispensed with, as a matter of course, and the necessity for the close fitting of the glass disk, (which is preferable to mica in this case,) as well as for the stuffing-box at the back, is not felt, for obvious reasons; the latter being replaced by an ordinary bearing, L'. Finally, the scale is marked upon the diaphragm I, inside the glass, in place of outside, as when heavy fluids are employed.

Figure 4:
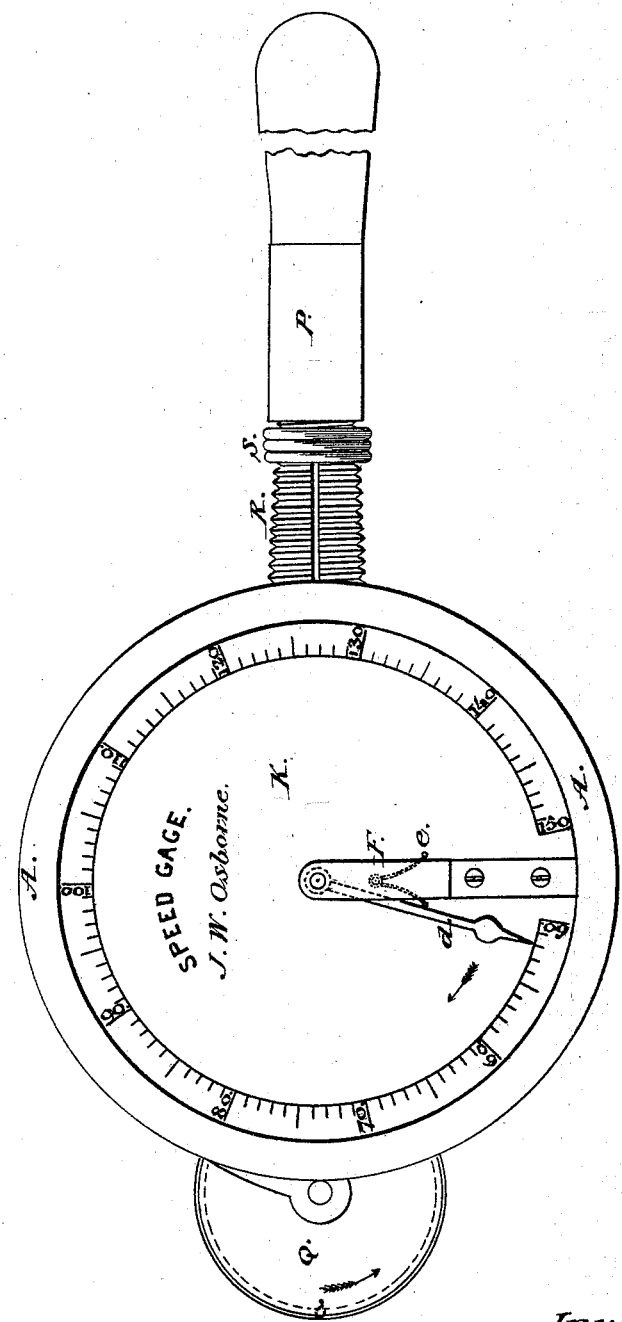
Fig. 4 is a front elevation of a gage, similar in all respects, but adapted for the employment of atmospheric air, as the fluid in which to produce the vortical current.
Figure 5:
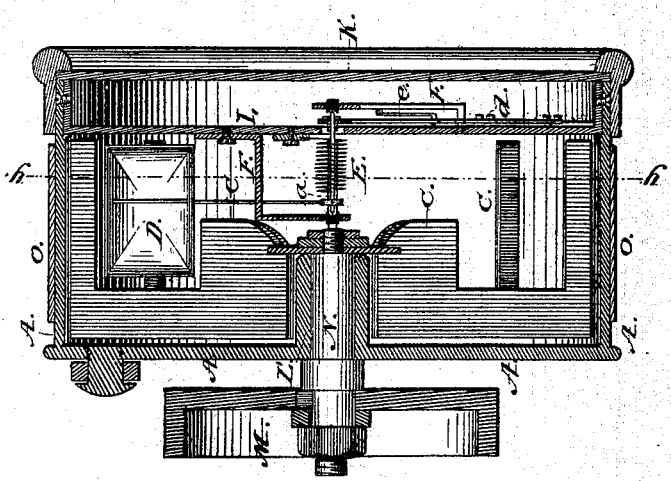
Fig. 5 shows a vertical cross-section, corresponding to that marked Fig. 2.
Figure 6:
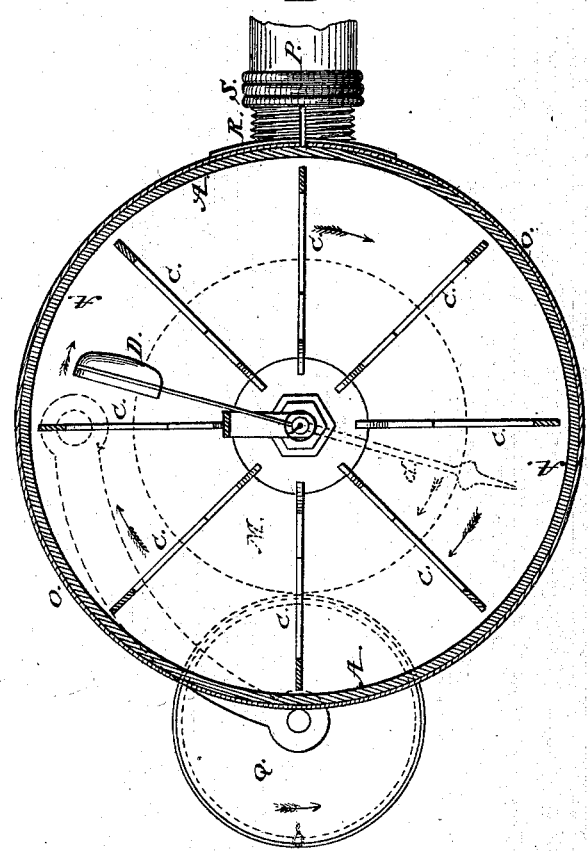
Fig. 6 is a vertical section, parallel to the face, on dotted line $y\,y$, Fig. 5, corresponding to that shown in Fig. 3.

Figs. 4, 5, 6 also illustrate the facility with which an instrument of this kind may be attached to a suitable handle, P, and so rendered portable; and also indicate the way in which a friction-roller, Q, attached to a movable arm or link, can be employed to drive the current-generator in place of a belt.

Figure 2:
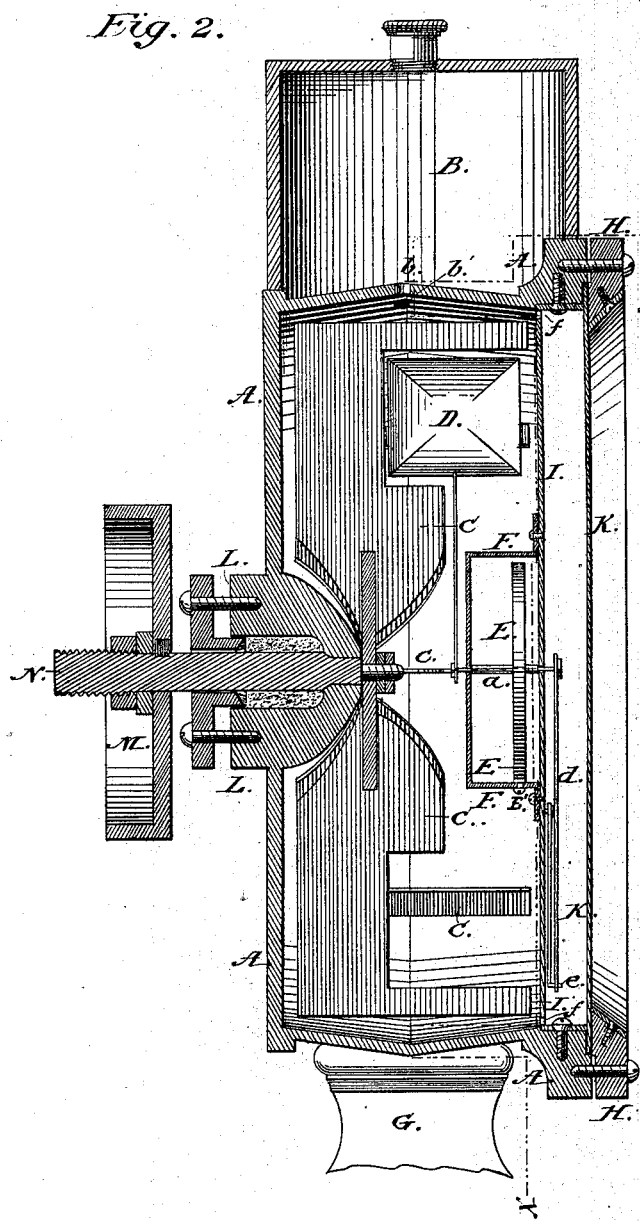
Figure 3:
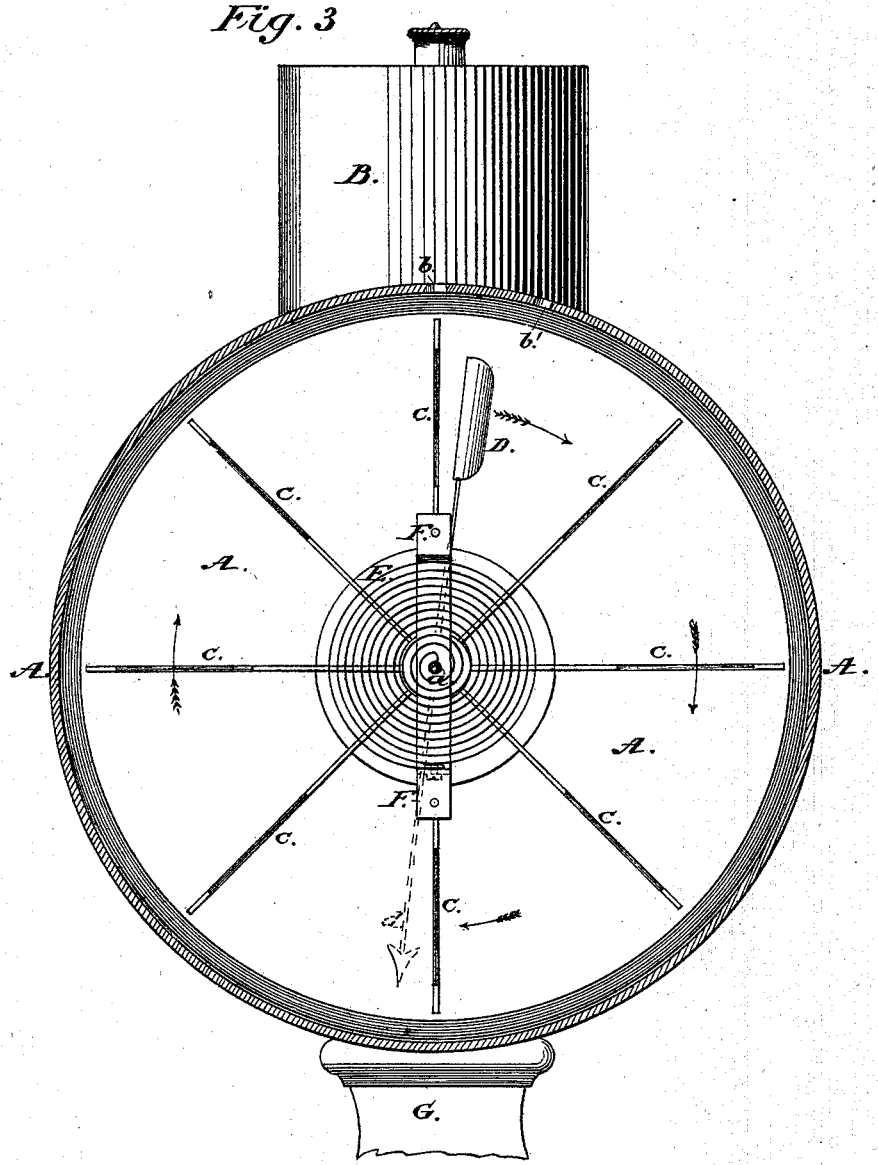

The handle P, shown in part in Figs, 4 and 6, may be fixed in any radial direction by means of the movable strap O O and split taper-screw R, with its compressing-nut S, shown in the drawing; or a stand or base, as in Figs. 1, 2, 3, may be substituted for the handle, if it is desired to make the gage fast.

The friction pulley Q is covered on its outer edge with rubber or leather, to prevent a slip between it and the pulley M, or between it and the moving body to be rated, with which it may be brought in contact. If desirable, it can be easily removed, to give place to a belt or other means of driving the shaft N.

Application.

My invention will be found to obviate altogether the necessity for "timing" moving apparatus by the watch; it is applicable for determining the speed of printing-presses, spinning and grinding machinery, paper mills, centrifugal machines, and shafting in factories; also for keeping a check upon the regular performance of motors generally; for determining the proper cutting speed of lathes and planers, and for aiding in the maintenance of the maximum speed of automatic tools and engines, consistent with the production of satisfactory work. It is also applicable to the determination of the speed of steam and other land carriages, of marine engines, and of the belting of machinery generally.

This device will also be found useful, if it is desired to obtain an indication or alarm, whenever a shaft or other mechanism has acquired a certain maximum or minimum rate of speed; as, for instance, by effecting an electrical connection (by which any necessary mechanical effect can be produced) whenever the pointer reaches a certain place in its path.

*Claim.*

What I claim, and desire to secure by Letters Patent, is—

The combination of a revolving mechanism for producing within a chamber a vortical motion in a fluid; a resisting vane or disk, actuated by the motion of said fluid; a spring or its equivalent, giving said vane its resisting power; and a pointer, or other moving device, by which the motion or position of said vane is indicated; the whole constituting a rate or speed gage, substantially as described.

JOHN W. OSBORNE.

Witnesses:
 EDW. W. DONN,
 SAMUEL CASSIDY.